United States Patent [19]

Fariss et al.

[11] Patent Number: 5,013,780
[45] Date of Patent: May 7, 1991

[54] PLASTICIZED POLYVINYL BUTYRAL AND INTERLAYER THEREOF

[75] Inventors: Robert H. Fariss, Northampton; Roland J. Tetreault, Springfield, both of Mass.

[73] Assignee: Monsanto Company, St. Louis, Mo.

[21] Appl. No.: 447,951

[22] Filed: Dec. 8, 1989

[51] Int. Cl.$^5$ ............................................. C08K 5/11
[52] U.S. Cl. .................................... 524/314; 428/437
[58] Field of Search .......................................... 524/314

[56] References Cited

U.S. PATENT DOCUMENTS 3,841,955  10/1974  Coaker et al. .
3,884,865   5/1975  Fariss et al. .
4,144,217   3/1979  Snelgrove et al. .
4,243,572   1/1981  Dages .
4,371,586   2/1983  Dages .
4,452,935   6/1984  Shigeru et al. .

Primary Examiner—Joseph L. Schofer
Assistant Examiner—N. Sarofim
Attorney, Agent, or Firm—Michael J. Murphy; William J. Farrington

[57] ABSTRACT

A composition of matter and an interlayer formed of such composition for a laminated glazing comprising polyvinyl butyral resin plasticized with a mixed adipate or a mixture of pure and mixed adipates made from: (a) at least one $C_4$ to $C_9$, preferably $C_6$, alkyl alcohol and (b) at least one cyclo ($C_4$ to $C_{10}$), preferably $C_6$, alcohol wherein the proportions of (a) and (b) in parts by weight per 100 parts of (a) and (b) are: (a) 10-90, preferably 30-80 and (b) 90-10, preferably 70-20.

18 Claims, 1 Drawing Sheet

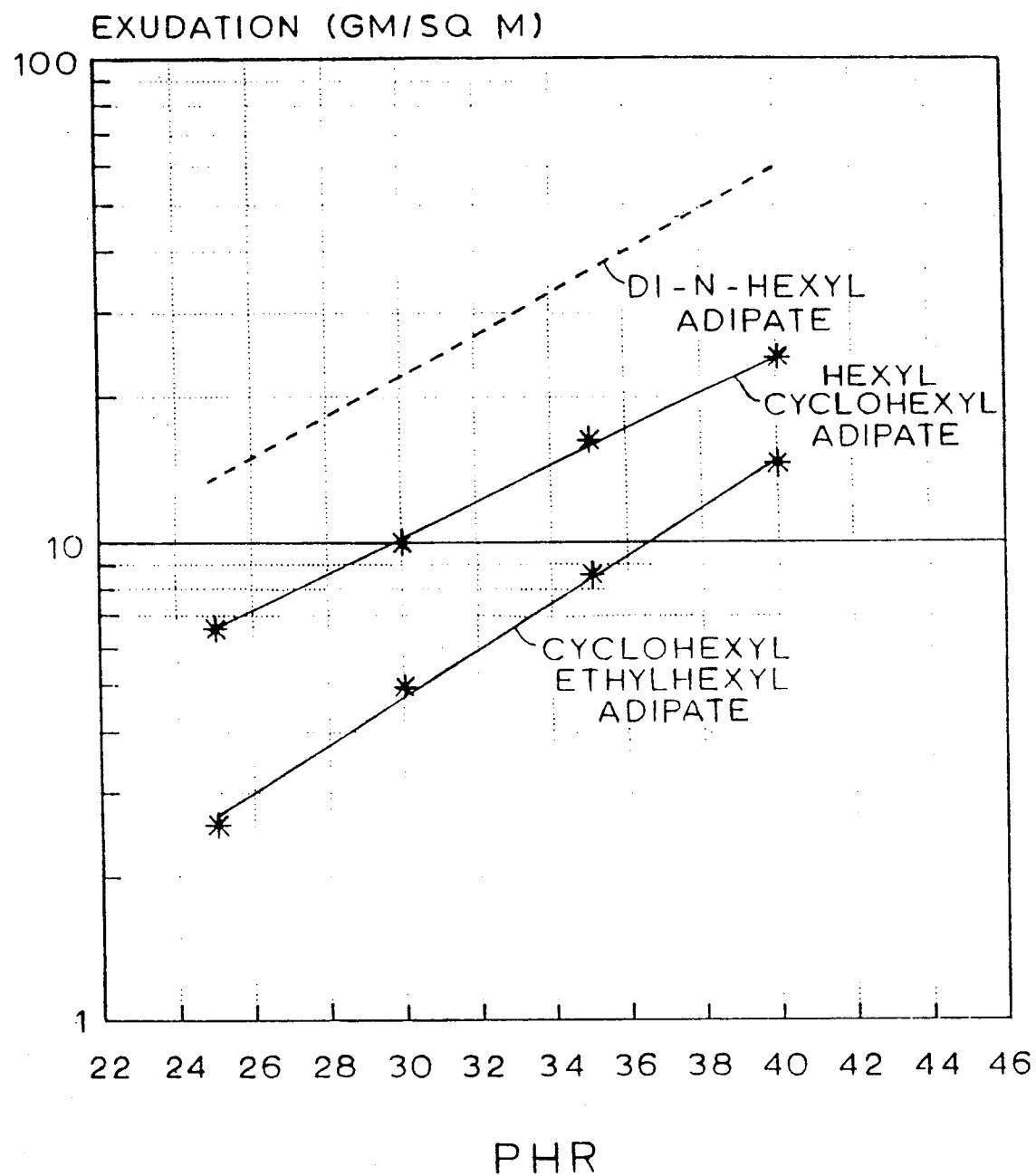

PLASTICIZED POLYVINYL BUTYRAL AND INTERLAYER THEREOF

BACKGROUND OF THE INVENTION

This invention relates to compositions and interlayers for laminated glazings and more particularly to plasticized polyvinyl butyral resin forming such interlayers.

Polyvinyl butyral (PVB) resin as sheet for use as optically transparent, impact-dissipating interlayer in multilayered laminated safety glazings is well known. Since the glass transition temperature of unplasticized PVB resin is too high for it to be a useful elastomer for impact dissipation in these applications, it is also known to reduce such temperature to a useful range by incorporating a plasticizer in such resin.

In choosing a plasticizer for PVB resin for such applications, it is further known to balance the impact-dissipating and edge stability capabilities of a glazing interlayer by using a mixture where each component of the mixture is better than the other in promoting one of these properties. Representative mixtures and their optimization are disclosed in U.S. Pat. Nos. 4,243,572 and 4,371,586 where aryl adipates in a mixture provide edge stability to the interlayer. Light stability of laminates using plasticized PVB resin, however, is also required for the intended architectural and motor-vehicle window applications involving prolonged exposure to sunlight. Optimizing shock absorbing, edge-delamination-resistant and UV stability properties in an interlayer through choice of an appropriate plasticizer has, to the best of present knowledge, not been accomplished in the prior art.

SUMMARY OF THE INVENTION

Now improvements have been made in plasticizer compositions which mitigate shortcomings of the prior art.

Accordingly, the principal object of this invention is to provide a plasticized PVB resin composition which, as an interlayer in a laminated glazing, provides a broad balance of performance properties.

Another object is to provide such a composition and interlayer which is color-stable to UV light and has improved resistance to edge delamination without suffering any penalty in low temperature impact performance.

A specific object is to provide an improved adipate plasticizer composition.

Other objects of this invention will in part be obvious and will in part appear from the following description and claims.

These and other objects are accomplished by providing a composition of matter comprising polyvinyl butyral resin plasticized with a mixed adipate or a mixture of pure and mixed adipates made from: (a) at least one $C_4$ to $C_9$ alkyl alcohol and (b) at least one cyclo ($C_4$ to $C_{10}$) alcohol wherein the proportions of (a) and (b) in parts by weight per 100 parts of (a) and (b) are: (a) 10-90, preferably 30-80 (b) 90-10, preferably 70-20. Component (a) is preferably ethyl hexyl alcohol or n-hexanol or 2-methyl pentanol while (b) is preferably cyclohexanol.

Also provided is a polyvinyl butyral interlayer for a laminated glazing plasticized with an effective amount of the above composition.

BRIEF DESCRIPTION OF THE DRAWING

In describing the overall invention, reference will be made to the accompanying drawing which is a graph illustrating the simulated edge stability improvement of the invention.

DETAILED DESCRIPTION OF THE INVENTION

The adipate plasticizer composition of the invention is prepared by esterifying adipic acid and an alcohol mixture of (a) one or more $C_4$ to $C_9$ linear or branched alkyl alcohols and (b) one or more saturated ring or cyclo ($C_4$ to $C_{10}$) alcohols. The resulting product is a mixture of pure and mixed adipates or, more particularly, a mixture of alkyl adipate, cycloalkyl adipate and alkyl, cycloalkyl adipate, a pure adipate having the same alcohol moiety on each end of the molecule and a mixed adipate having a different alcohol moiety on each such end. Mixed adipates without the presence of a pure adipate species, however, can be used and are within the scope of the invention. Such mixed adipates are synthesized by distilling a mixture of pure and mixed adipates obtained by esterifying the above alcohol mixture to isolate the pure mixed adipate species having the linear or branched aliphatic moiety on one end and the saturated cycloaliphatic moiety on the other end. Representative alcohols of component (a) include saturated aliphatic alcohols, both straight and branch chain isomers, of butanol, pentanol, hexanol, heptanol, octanol and nonanol and mixtures of any two or more of the foregoing. Ethyl hexyl alcohol, n-hexanol and/or 2-methyl pentanol are preferred. Representative saturated ring alcohols of component (b) include cyclobutanol, cyclopentanol, cyclohexanol, cycloheptanol, cyclooctanol, cyclononanol and cyclodecanol. Preferred saturated ring alcohols are cyclopentanol, cyclohexanol, cycloheptanol and cyclooctanol with cyclohexanol particularly preferred.

The structural formulas of pure and mixed adipates of the invention where (a) is ethyl hexyl alcohol and (b) is cyclohexanol are as follows:

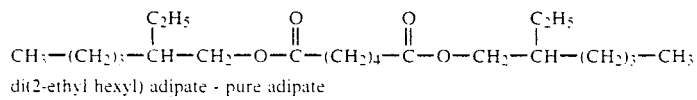
di(2-ethyl hexyl) adipate - pure adipate

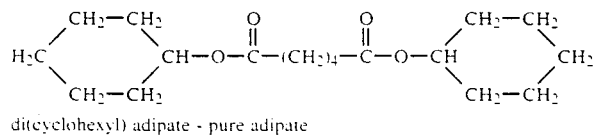
di(cyclohexyl) adipate - pure adipate

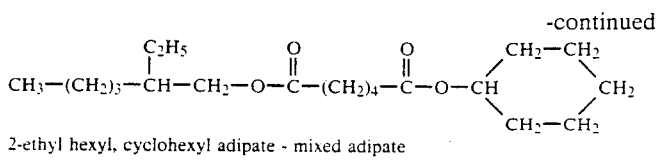

2-ethyl hexyl, cyclohexyl adipate - mixed adipate

Unsaturated ring adipates are not within the scope of the invention since subject to oxidative breakdown, particularly in the presence of ultraviolet light.

The proportion of (a) and (b) alcohols chosen depends on the relative effect of the adipates formed by each alcohol on edge stability and impact performance of interlayer containing the particular adipate. In other words, such proportion depends on which of these properties an interlayer user wishes to emphasize as well as the particular (a) and (b) species used. Proportions of 10-90, preferably 30-80, weight parts (a) and 90-10, preferably 70-20, weight parts (b) per 100 weight parts (a) and (b) generally provide an operable balance of these properties for any combination of (a) and (b) alcohol species within the scope of the invention.

The PVB resin employed has a weight average molecular weight greater than 100,000, preferably from about 200,000 to 300,000, as measured by size exclusion chromatography using low angle laser light scattering. Such PVB comprises, on a weight basis, 15 to 25%, preferably 18 to 22% hydroxyl groups calculated as polyvinyl alcohol (PVOH); 0 to 10%, preferably 0 to 3% residual ester groups, calculated as polyvinyl ester, e.g. acetate, with the balance being butyraldehyde acetal. The amount of plasticizer in the formulation to form the interlayer sheet depends on the specific PVB resin used and the properties desired in the application. Generally between 15 to 50, preferably 25 to 40 parts plasticizer per 100 parts of PVB resin (PHR) is used.

PVB resin is produced by known aqueous or solvent acetalization processes wherein PVOH is reacted with butyraldehyde in the presence of acid catalyst to produce PVB, followed by neutralization of the catalyst, separation, stabilization and drying of the PVB resin. It is commercially available from Monsanto Company as Butvar ® resin.

Plasticized PVB as interlayer sheet having a thickness of about 0.13 to 1.3 mm is formed by initially mixing the PVB resin with the plasticizer (and optional additional well-known property-enhancing additives) and then extruding the formulation through a sheeting die, i.e. forcing molten, plasticized PVB through a horizontally long vertically narrow die opening substantially conforming in length and width to that of the sheet being formed, or by casting molten polymer issuing from an extrusion die onto a specially prepared surface of a die roll in close proximity to the die exit to impart desired surface characteristics to one side of the molten polymer. When the roll surface has minute peaks and valleys, sheet formed of polymer cast thereon will have a rough surface on the side contacting the roll which generally conforms respectively to such valleys and peaks. A rough surface on the other side can be provided by the design of the die opening through which the extrudate passes. Such a die opening configuration is more particularly shown in FIG. 4 of U.S. Pat. No. 4,281,980. Alternative known techniques of producing a rough surface on one or both sides of an extruding sheet involve the specification and control of one or more of the following: polymer molecular weight distribution, water content and temperature of the melt. Such techniques are disclosed in U.S. Pat. Nos. 2,904,844; 2,909,810; 3,994,654; 4,575,540 and European Patent No. 0185,863. As is known, this rough surface on the interlayer is only temporary and particularly functions to facilitate deairing during laminating after which it is melted smooth from the elevated temperature and pressure associated with autoclaving.

In addition to plasticizer, interlayers of the invention may contain other additives such as dies, pigments, ultraviolet light stabilizers, antioxidants, adhesion control salts and the like.

The following tests were used to obtain results listed in the Examples.

(A) Compatibility (1) Exudation Test—Plasticizer and PVB resin compatibility as reflected in long term interlayer edge stability in a laminate is simulated by this laboratory test. Various amounts of plasticizer and PVB resin were blended for 7 min at 150° C. in a Brabender mixer equipped with sigma blades turning at 50 rpm. Using a heated hydraulic press (149° C., 5.5 MPa for 5 min), the resulting plasticized PVB resin was pressed into 0.76 mm thick sheets which are representative of interlayer usable with glass in laminated glazings. The sheets were cut into 17.5×38 mm samples, dried for 5 days in a desiccator and weighed to get dry weight. These samples were then placed in a wet desiccator (enclosed chamber containing water) for seven days. Each sample was then sandwiched between layers of absorbing cardboard, placed between jaws of a clamp being forced together at a pressure of 1.6 MPa The clamped samples were placed in a wet desiccator for 10 days. The clamps were removed, the samples washed with warm water to remove residual cardboard, dried five days in a dry desiccator and again weighed. The weight difference in gm/m$^2$ of surface area is plasticizer exudation weight loss. Exudation Ratio is the ratio of the exudation weight loss of plasticizers according to the invention to that of 100% di-n-hexyl adipate (DHA) a control plasticizer which was run in parallel with invention plasticizers.

(2) Edge Stability—0.76mm thick sheets of plasticized PVB resin were placed between two 15.2 cm×15.2 cm×0.23 cm glass plates. The layers were then held in an autoclave for about 7 min at 1.2 MPa, 135° C. to laminate the glass and sheet. The laminates were then exposed in Florida at a 45 degree angle facing south and periodically visually observed for signs of edge delamination and compared to a control. Performance with exposure time was measured by Edge Stability Number (ESN). The ESN for a particular interlayer is based on nine sample laminates containing such interlayer. ESN is a value obtained by an arbitrary method for calculating edge defects in a laminate which is proportional to the amount of total delamination attributable to a particular test interlayer for the nine laminate sample of that interlayer. More particularly, it is a mathematical summation of defect length times a weighting factor corresponding to the depth or distance of each defect from the edge of the laminate sample.

(B) Impact Resistance (1) Mean Penetration Velocity—30.5×30.5 cm×0.76 mm two ply glass laminates were prepared using the laminating conditions recited above and were individually horizontally positioned in a support frame. While at a constant laminate temperature, a 2.27 kg spherical ball was dropped from a designated height onto the center of the laminate. Two spaced magnetic coils were positioned beneath the test laminate. After penetrating a laminate, the ball sequentially passed through magnetic fields created by the coils and as these fields were disturbed the top coil triggered a timer "on" switch while the bottom coil turned it off. Knowing the time to traverse the distance between coils permits calculating ball velocity. This residual ball velocity is related to energy absorbed by the laminate and absorbed energy in miles per hour (mph) equals laminate Mean Penetration Velocity (MPV). Measured MPV is the average of multiple ball drops from different heights. MPV Ratio is the measured MPV for the experimental sample divided by the MPV of the control.

(2) Pummel Adhesion measures interlayer adhesion to glass. Two ply glass laminates prepared as recited above for the MPV test were conditioned to −17° C. and manually pummeled with a 1 pound (454 g) hammer to break the glass. All broken glass unadhered to the PVB layer was then removed. The amount of glass left adhered to the interlayer is visually compared with a set of standards of known pummel scale, the higher the number of the standard, the more glass remaining adhered to the interlayer—i.e. at a pummel of zero, no glass at all is left whereas at a pummel of 10, 100% of the interlayer surface is adhered to the glass. Desirable impact dissipation occurs at a pummel adhesion value of 3 to 7, preferably 4 to 6. At less than 3 too much glass is lost whereas at more than 7 adhesion is generally too high and shock absorption is poor.

(C) Volatility

Volatility of plasticizer was determined by thermal gravimetric analysis (TGA) using a Perkin Elmer TGA7 in a nitrogen atmosphere over a 35°–200° C. cycle at a 10° C./min rate. Result as Volatility Ratio is the ratio of weight loss for the sample to that of the control.

(D) Laminate Color

Yellowness Index—Two ply glass laminates with sample interlayer of 3.2 mm thick were prepared as recited above. Yellowness Index was measured using a Hunter D54 Spectrophotometer.

The following list identifies abbreviations used for various adipates in the Examples.

| DHA | di-n-hexyl adipate | (pure) |
|---|---|---|
| CEHA | cyclohexyl ethyl hexyl adipate | (mixed) |
| HCHA | n-hexyl, cyclohexyl adipate | (mixed) |
| DCHA | di(cyclohexyl) adipate | (pure) |

The invention is further described with reference to the following Examples which are not intended to limit or restrict the invention. Unless otherwise indicated, all quantities are expressed in weight.

EXAMPLES 1, 2 and COMPARATIVE EXAMPLES C1, C2

Examples 1 and 2 illustrate the improved combination of impact and edge stability performance of glass laminates made using interlayer formed from plasticizer mixtures according to the invention in comparison with Comparative Example C1 where the plasticizer was pure di-n-hexyl adipate. Such latter control interlayer is considered an adipate standard for comparison purposes and is further described in U.S. Pat. No. 3,854,865, Examples 6–24. Comparative Example $C_2$ illustrates that pure adipates formed using saturated ring alcohols alone are unsuitable.

Preparation of Adipate Mixtures

1. N-hexyl, cyclohexyl adipate (HCHA)

The following was charged to a jacketed reactor equipped with an agitator and a reflux condenser having an oil-water separator on the downstream process side.

| Component | Amount (Kg) |
|---|---|
| Adipic Acid | 66.3 |
| N-hexanol | 60.3 |
| Cyclohexanol | 59.7 |
| Toluene | 36.0 |
| Methane Sulfuric Acid | 0.23 |

The agitator was started and the reactor contents heated at atmospheric pressure to about 110° C. to initiate reflux. Heating continued until the reaction mixture reached about 125° C. and for about four hrs. thereafter while removing water through the separator. Reactor pressure during this time was reduced to maintain this temperature. The esterification reaction was considered complete when water no longer issued from the separator.

To neutralize catalyst and unreacted adipic acid, 10% aqueous caustic was added in amount adequate to maintain a pH of 8 in the aqueous phase which was then decanted to remove sodium salts of the acids. The reactor contents was then washed twice with water (19 liters) with agitation. After phase separation the water phase was decanted and discarded. The pressure was reduced to 20 in (71.1 cm) mercury vacuum while heating to maintain 125° C. to remove toluene and unreacted alcohols and then sparged for about 30 min with steam at 3.15 kg/cm$^2$ absolute. The reaction mixture was then cooled and analyzed using gas chromatography as:

25–35% di-n-hexyl adipate
15–25% di(cyclohexyl) adipate
50% n-hexyl, cyclohexyl adipate 2. 2-ethyl hexyl, cyclohexyl adipate (CEHA)

The procedure in 1. above was repeated using, instead of n-hexanol, 76.9 kg of 2-ethyl hexanol. The final composition had the following analysis:

30–40% di-2-ethyl hexyl adipate
10–20% di(cyclohexyl) adipate
50% 2-ethyl hexyl, cyclohexyl adipate

Preparation and Testing of Interlayer

PVB resin for admixture with the foregoing adipate plasticizer mixture had less than 3% residual acetate groups and a PVOH content of 18.2 percent. Interlayer performance results obtained are in Table 1 following.

Exudation Test results at various loadings of the plasticizers of Examples 1,2 and C1 are depicted in the drawing.

TABLE 1

|  | Example 1 | Example 2 | Example C1 | Example C2 |
|---|---|---|---|---|
| Plasticizer | HCHA | CEHA | DHA | DCHA |
| PHR | 32.8 | 38.7 | 32.0 | 35.7 |
| Volatility Ratio (VR) | 0.96 | 0.56 | 1.00 | 0.70 |
| Exudation Ratio | 0.41 | 0.54 | 1.0 | 0.13 |
| Pummel Adhesion (at $-17.8°$ C. and 0.5% $H_2O$) | 7.1 | 7.0 | 6.3 | 7.9 |
| Laminate Color (Yellowness Index) | — | 7.6 | 6.6 | — |
| Edge Stability No. (ESN) @ nine months | 0 | — | 910 | 0 |
| Mean Penetration Velocity Ratio |  |  |  |  |
| $-17.8°$ C. | 1.07 | 0.71 | 1.00 | — |
| $15.6°$ C. | 1.08 | 0.98 | 1.00 | — |
| $48.9°$ C. | 1.06 | 1.13 | 1.00 | — |

With respect to MPR Ratio for Example C2, to indirectly characterize the projected low temperature impact performance, the beta transition area from a dynamic mechanical test was considered. This area has been correlated with low temperature impact performance of plastics—see J. Heijboer, Journal of Polymer Science; Part C; 16,3755 (1968). This beta transition area is predicted to be very small compared to that for control Example C1. This shows that though edge stability performance using the saturated ring adipate composition above is excellent, without the alkyl moiety in the adipate the important impact performance property is not achieved.

The above results of Exs. 1 and 2 vis-a-vis the DHA of control C1 illustrate: (1) significantly improved edge stability as reflected in the greatly reduced Exudation Ratios and ESN of (EX. 1) and (ii) generally comparable low temperature impact (pummel adhesion and MPV Ratio at $-17.8°$ C.) and laminate color; (iii) lower VR (significantly in Ex. 2). Low VR is desirable to minimize plasticizer loss from the interlayer, particularly with air autoclave laminating systems where elevated temperature negative vacuum pressure conditions occur.

The preceding description is for illustration only and is not to be taken in a limited sense. Various modifications and alterations will be readily suggested to persons skilled in the art. It is intended, therefore, that the foregoing be considered as exemplary only and that the scope of the invention be ascertained from the scope of the following claims.

We claim:

1. A composition of matter comprising polyvinyl butyral resin plasticized with adipic acid diester in the form of a mixed adipate or a mixture of pure and mixed adipates made from:
   (a) at least one $C_4$ to $C_9$ alkyl alcohol; and
   (b) at least one cyclo ($C_4$ to $C_{10}$) alcohol;
wherein the proportions of (a) and (b) in parts by weight per 100 parts of (a) and (b) are:
   (a) 10-90
   (b) 90-10.

2. The composition of claim 1 wherein the alkyl alcohol is ethyl hexyl alcohol, n-hexanol or 2-methyl pentanol.

3. The composition of claim 2 wherein the alkyl alcohol is ethyl hexyl alcohol.

4. The composition of claim 2 wherein the alkyl alcohol is n-hexanol.

5. The composition of claims 1, 2, 3 or 4 wherein the cyclo alcohol is cyclopentanol, cyclohexanol, cycloheptanol or cyclooctanol.

6. The composition of claim 5 wherein the cyclo alcohol is cyclohexanol.

7. The composition of claim 6 wherein the polyvinyl butyral weight average molecular weight is between about 200,000 to 300,000 and comprises 0 to 3 weight percent ester groups calculated as polyvinyl acetate and 15 to 25 weight percent hydroxyl groups calculated as polyvinyl alcohol.

8. The composition of claim 7 wherein the adipate mixture is present in an amount of 25 to 40 parts per hundred parts of resin.

9. A polyvinyl butyral interlayer for a laminated glazing plasticized with an effective amount of a mixed adipate or a mixture of pure and mixed adipates made from:
   (a) at least one $C_4$ to $C_9$ alkyl alcohol; and
   (b) at least one cyclo ($C_4$ to $C_{10}$) alcohol;
wherein the proportions of (a) and (b) in parts by weight per 100 parts of (a) and (b) are:
   (a) 10-90
   (b) 90-10.

10. The interlayer of claim 9 wherein the alkyl alcohol is ethyl hexyl alcohol, n-hexanol or 2-methyl pentanol.

11. The interlayer of claim 10 wherein the alkyl alcohol is ethyl hexyl alcohol.

12. The interlayer of claim 10 wherein the alkyl alcohol is n-hexanol.

13. The interlayer of claims 9, 10, 11 or 12 wherein the cyclo alcohol is cyclohexanol, cycloheptanol or cyclooctanol.

14. The interlayer of claim 13 wherein the alcohol is cyclohexanol.

15. The interlayer of claim 14 wherein the polyvinyl butyral weight average molecular weight is between about 200,000 to 300,000 and comprises 0 to 3 weight percent ester groups calculated as polyvinyl acetate and 15 to 25 weight percent hydroxyl groups calculated as polyvinyl alcohol.

16. The interlayer of claim 15 wherein the adipate mixture is present in an amount of 25 to 40 parts per hundred parts of resin.

17. The composition of claim 8 wherein the proportions of (a) and (b) in parts by weight per 100 parts of (a) and (b) are:
   (a) 30-80
   (b) 70-20.

18. The interlayer of claim 16 wherein the proportions of (a) and (b) in parts by weight per 100 parts of (a) and (b) are:
   (a) 30-80
   (b) 70-20.

* * * * *